Jan. 5, 1971   C. A. LAUTER, JR   3,552,206
THREE VECTOR WIND DIRECTION INTEGRATOR
Filed March 10, 1969   2 Sheets-Sheet 1

INVENTOR
CHARLES A. LAUTER, JR.

BY
ATTORNEY

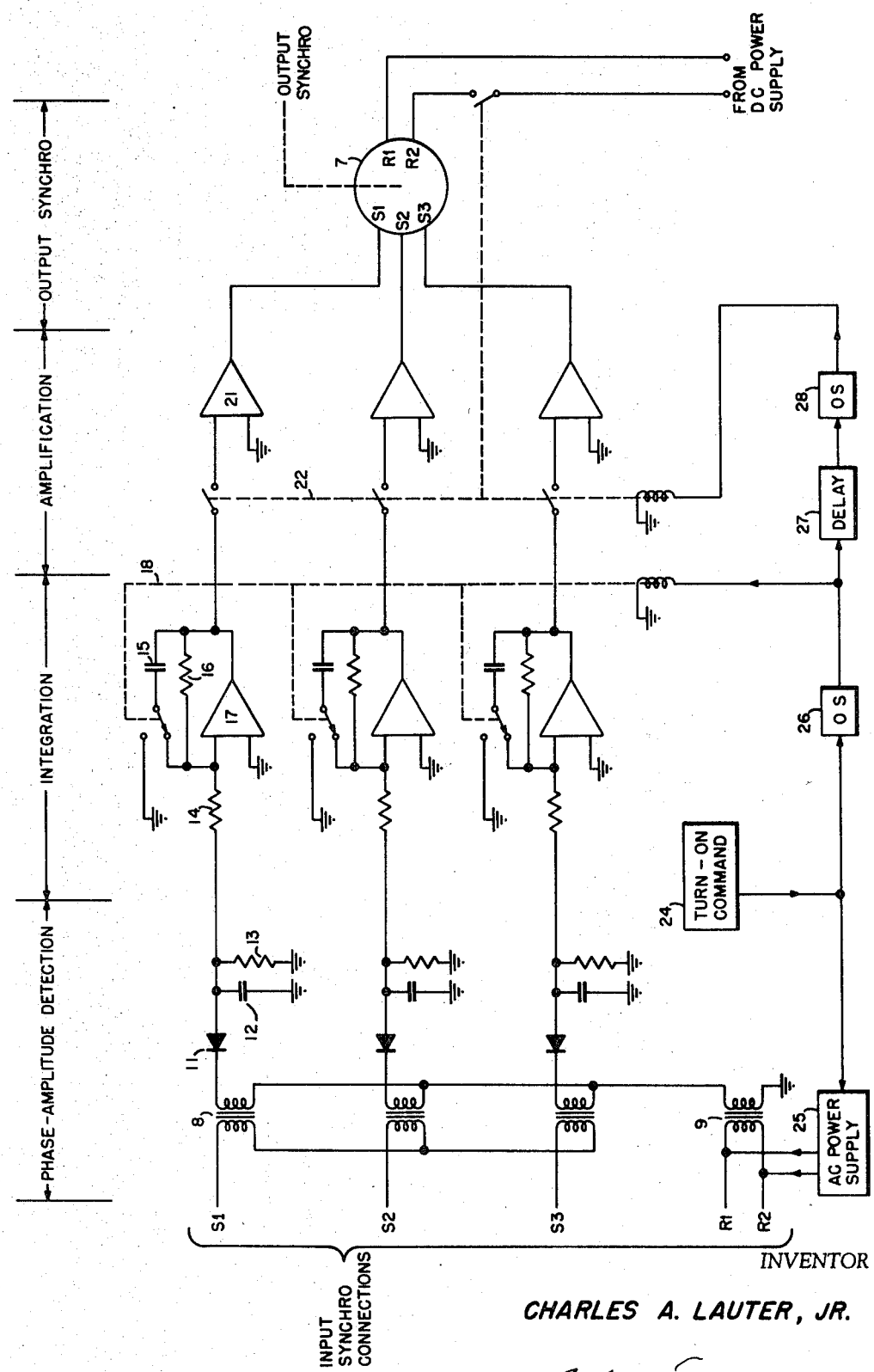

United States Patent Office

3,552,206
Patented Jan. 5, 1971

3,552,206
THREE VECTOR WIND DIRECTION INTEGRATOR
Charles A. Lauter, Jr., Oxon Hill, Md., assignor to the United States of America as represented by the Secretary of the Navy
Filed Mar. 10, 1969, Ser. No. 805,502
Int. Cl. G01p 13/02
U.S. Cl. 73—188                6 Claims

ABSTRACT OF THE DISCLOSURE

The invention consists of apparatus for measuring the average wind direction comprising an input synchro transmitter coupled to a wind vane for producing component signals representing the instantaneous position of the vane. These signals are detected, integrated and applied to an output synchro the shaft of which is positioned in accordance with the combined integrated signals from the synchro transmitter.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates generally to metorological instruments, and more particularly to an improved means for measuring wind direction.

Prior art systems have consisted of devices as simple as an arrow rotatably mounted to point in the direction of the wind. Today more sophisticated apparatus is employed. In order to predict the weather, meteorologists require information concerning wind conditions over a wide geographical area. For this reason several unmanned weather stations are monitored remotely from a centralized information receiving center. These stations are located in areas which experience harsh climate conditions such as extreme temperatures. Such equipment must be capable of operating dependably under rigorous conditions and require little maintenance.

Another desirable feature of a wind direction sensing device is that it be able to monitor an average value of wind direction. Gusts coming from random directions tend to make an instantaneous reading of wind direction inadequate for many purposes. It is the average wind direction over a period of time which is more important for a variety of purposes. In addition it is desirable to be able to conveniently change the period of time over which the average reading is taken. Prior art systems utilizing a servo follower required a change in gear assembly to accomplish this. Such a substitution is costly and not easily performed.

OBJECTS OF THE INVENTION

It is therefore an object of the invention to provide a device for measuring wind direction accurately.

A further object is to provide a system which requires very little maintenance thereby being capable of operating in remote locations under harsh weather conditions.

Another object is to provide a meteorological instrument capable of measuring the average wind direction over a preselected period of time.

Still another object is to provide a system which has the capability of conveniently and inexpensively changing the time over which the average value is taken.

These and other objects are achieved by means of the system of the invention which consists of a synchro transmitter to translate the position of a weather vane into three component signals wherein the positional data is contained in the phase and amplitude of these signals. The relative phase and amplitude of these component signals changes with the instantaneous reading derived from the position of the wind vane. These component signals are next detected and averaged and the resulting D.C. component signals are fed into an output synchro which combines the D.C. signals and positions its shaft in accordance with the angle represented by those signals.

BRIEF DESCRIPTION OF THE DRAWINGS

A more complete description of the invention will follow with reference to the drawings in which:

FIG. 2 shows in more detail the circuitry of the wind direction integrator portion of the invention.

DESCRIPTION OF THE PREFERRED EMBODIMENT

Figure 1:
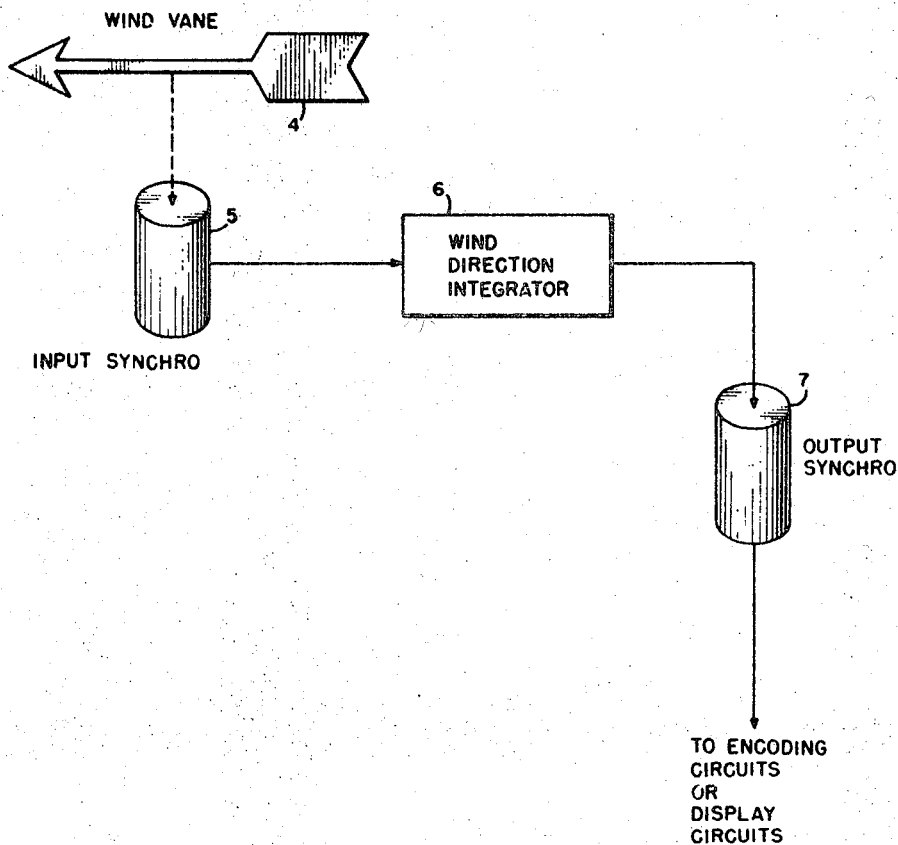
FIG. 1 is a perspective view of the invention with the circuitry shown in block form.

In FIG. 1 is shown a block diagram of the system wherein a wind vane 4 is positioned according to the wind direction. The wind vane 4 is mechanically coupled to the rotor of the synchro transmitter 5 which produces a signal indicative of the instantaneous position of the wind vane. This signal is then integrated by means of a wind direction integrator circuit 6 the output of which is applied to an output synchro 7 the shaft of which moves in accordance with the average wind direction. The output of the synchro 7 could be implemented to move a recorder at the location of the system or alternatively could be used to encode a signal to be transmitted to a central information gathering center. Several forms of indicators common in the art could be employed to monitor the wind direction. The shaft movement could be converted to a digital signal which could be transmitted to an information center and decoded.

$S_1$–$S_3$ and $R_1$–$R_2$ represent the output leads from the stator and rotor windings respectively of the input synchro. The input synchro transmitter is activated by an A.C. source and operates in a conventional fashion whereby the angular position of the rotor, which is mechanically coupled to the wind vane, induces voltages in the stator windings. Thus a variation in wind direction changes the position of the wind vane which in turn moves the rotor thereby varying the phase and amplitude of the A.C. signals induced in the stator windings. In order to abstract the signal present in each of the input synchro stator windings the transformers 8 are connected to the leads of the synchro as shown in FIG. 2. The voltage outputs of the stator windings go through two maximums and two minimums for each revolution of the rotor. This ambiguity is removed by the addition of a phase reference signal from transformer 9. The sum of the signals from transformers 8 and 9 will go through one maximum and one minimum for each revolution of the synchro rotor.

Using the above circuitry the instantaneous direction of the wind is translated into three component signals, each of which is directed into a detection circuit consisting of diode 11, capacitor 12 and resistor 13. Each of the three detection circuits is associated with a separate stator winding of the input synchro and each has identical electrical components. The same numerical designation will be used to refer to corresponding components in each of the three processing circuits.

The output of each detection circuit is a function of the amplitude and phase of the A.C. signal present in its corresponding stator winding, and is fed into an averaging or integrating circuit consisting of an operational amplifier 17 connected in a unit lag or integrator configuration when switch 18 is in the position shown. A feedback is accomplished by means of resistor 16 and capacitor 15. When switch 18 is in the position shown the output from the operational amplifier will be equal to the average value of the input over a time period determined by the time constant of the integrating circuit. A discussion of the operation of a similar type integrator as used in the invention can be found in U.S. Pat. No. 3,182,503 along with methods of changing the time constant of the circuit. The integrated signal out of the amplifier 17 is amplified by amplifier 21 and applied to the stator coils $S_1$–$S_3$ of an output synchro 7 causing currents to flow in these stator windings. These currents produce a magnetic field which causes the output synchro to act as a D.C. torque motor, thereby positioning its shaft in accordance with the magnetic field. A D.C. source is coupled to the rotor leads $R_1$–$R_2$ of the output synchro by means of switch 22. As previously noted with respect to FIG. 1, the position of the shaft of the output synchro can be mechanically coupled to a suitable indicator or to a suitable transducer for producing an electrical signal for transmission to a central information gathering station. The methods of accomplishing such translation are by themselves, old in the art.

As mentioned previously, several time constants can be used in connection with the integrating circuit of the invention. If a long time constant is felt to be most appropriate it will result in an undesirably long total time from the application of power until the integration is accomplished. This problem can be avoided by means of the initial position acquisition feature of the invention which consists of placing switch 18 momentarily in an alternate position thereby grounding capacitor 15. In this manner the time constant of the integrator is reduced thereby allowing the capacitor 15 to charge within a small percentage of its final value in a fraction of the time it would normally take. The switch 18 would normally be in its alternate position for only a fraction of a second.

The sequence of operation for a remote station will be explained with reference to FIG. 2. A turn-on command signal is generated at a central information gathering station 24 which activates the A.C. power supply 25 and also energizes a one shot multivibrator 26. The output of multivibrator 26 will operate switch 18 allowing capacitor 15 to charge to within a fraction of its final value. Normally switch 18 will be in the position shown in FIG. 2 and will be in its alternate position for only a fraction of a second. The output of multivibrator 26 will first pass through a delay means 27 and then be applied to one shot multivibrator 28 which will close switch 22 for a time long enough to permit the positioning of the shaft of the output synchro 7. The above sequence is appropriate for an unmanned station. However, the invention could be utilized with equal effectiveness in a manned station in which case the switches could be operated by hand. In addition if the A.C. power source is connected to the input synchro rotor continuously the dual time constant feature made possible by switch means 18 would not be needed. It is obvious that the switches shown in FIG. 2 can be replaced by other devices which perform the same function such as transistors. It is also possible to convert the three component signal from the synchro 5 into a two component signal thereby reducing the number of integrator channels required. This would also require replacing the output synchro with a two phase torque motor. The disadvantage of this alternative however is increased position error of the output shaft.

What is claimed and desired to be secured by Letters Patent of the United States is:

1. Apparatus for measuring average wind direction comprising:
    a wind vane,
    input means coupled to said vane for generating a plurality of D.C. signals indicative of the instantaneous position of said vane,
    integrating means coupled to said input means for generating a plurality of signals equal to the average value of said D.C. signals over a preselected time period, and
    an output synchro coupled to said integrating means, the shaft of said output synchro being positioned in response to the output of said integrating means, for indicating the average wind direction.

2. The apparatus as recited in claim 1 wherein said input means includes:
    an input synchro, the rotor of which is coupled to said vane.

3. The apparatus as recited in claim 2 wherein said input means further includes:
    transformer means coupled to the stator windings of said input synchro for generating a plurality of A.C. signals whose amplitude and phase are a function of the signals induced in said stator windings, and
    circuit means coupled to said transformer means for detecting said plurality of A.C. signals.

4. The apparatus as recited in claim 3 wherein said integrating means comprises:
    a plurality of operational amplifiers each connected in an integrating configuration and each coupled to a separate stator winding of said input synchro.

5. The apparatus as recited in claim 3 further including:
    circuit means for momentarily altering the time constant of said integrating means.

6. The apparatus as recited in claim 1 further including:
    a D.C. source coupled to the rotor of said output synchro, and
    means for applying said D.C. signals from said integrating means to the stator windings of said output synchro.

References Cited

UNITED STATES PATENTS

| | | | |
|---|---|---|---|
| 3,119,260 | 1/1964 | Karmin | 73—189 |
| 3,182,503 | 5/1965 | Corcoran | 73—229 |
| 3,316,761 | 5/1967 | Frith et al. | 73—189 |

RICHARD C. QUEISSER, Primary Examiner

J. B. BEAUCHAMP, Assistant Examiner